United States Patent [19]
Weingartner

[11] Patent Number: 5,467,416
[45] Date of Patent: Nov. 14, 1995

[54] LIGHT INPUT REFLECTOR FOR OPTICAL-FIBER SYSTEMS

[75] Inventor: Harold Weingartner, Telfs, Austria

[73] Assignee: D. Swarovski & Co., Wattens, Austria

[21] Appl. No.: 207,194

[22] Filed: Mar. 8, 1994

[30] Foreign Application Priority Data

Mar. 10, 1993 [DE] Germany ............... 43 07 581.9

[51] Int. Cl.⁶ ................................................. G02B 6/26
[52] U.S. Cl. .................... 385/31; 359/869; 385/38
[58] Field of Search .................. 385/31–38; 359/868, 359/869, 884

[56] References Cited

U.S. PATENT DOCUMENTS

| | | | |
|---|---|---|---|
| 3,923,375 | 12/1975 | Bowerman | 385/36 |
| 3,926,501 | 12/1975 | Hama | 385/31 |
| 4,380,794 | 4/1983 | Lawson | 362/296 |
| 4,747,660 | 5/1988 | Nishioka et al. | 385/31 |
| 4,794,503 | 12/1988 | Wooten et al. | 362/346 |
| 4,887,190 | 12/1989 | Sadamune et al. | 385/33 X |
| 4,902,093 | 2/1900 | Bowen | 385/31 |
| 5,021,928 | 6/1991 | Daniel | 385/31 X |
| 5,271,077 | 12/1993 | Brockman et al. | 385/31 |

FOREIGN PATENT DOCUMENTS

| | | |
|---|---|---|
| 322501A1 | 12/1982 | Germany . |
| 3804732A1 | 8/1989 | Germany . |
| 3831273C2 | 6/1992 | Germany . |
| 63-92909 | 4/1988 | Japan ............... 385/38 |

Primary Examiner—John D. Lee
Attorney, Agent, or Firm—Fish & Richardson

[57] ABSTRACT

A light input reflector for optical-fiber systems wherein at least 50% of the deviated luminous flux of the lamp hits the light entrance surface of the optical-fiber system.

7 Claims, 1 Drawing Sheet

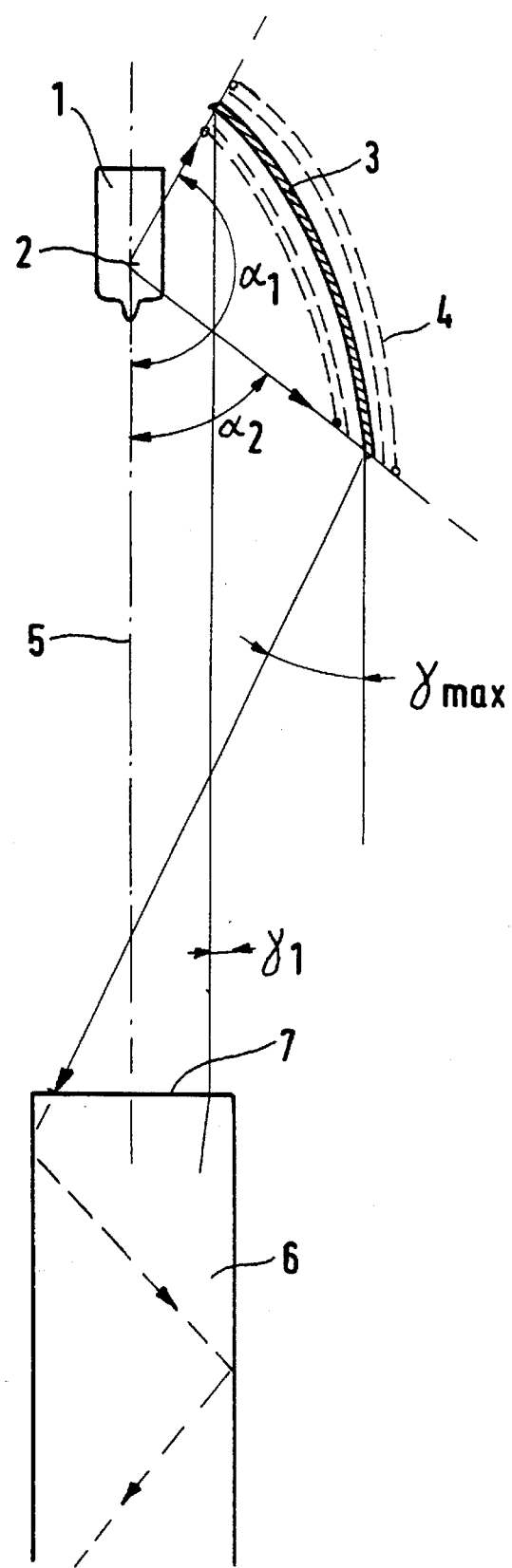

LIGHT INPUT REFLECTOR FOR OPTICAL-FIBER SYSTEMS

BACKGROUND OF THE INVENTION

1. Field of the Invention

The present invention relates to a light input reflector for optical-fiber systems. The reflector is calculable with an algorithm and distinguishes itself from conventional reflectors by its many times higher efficiency.

2. Discussion of the Related Art

Light input reflectors are known from traffic signal technology and medical technology for coupling light into optical-fiber systems, for example glass fibers. Up to now efficiencies of 1 to about 7% have been obtained, based on a 1.5 m glass-fiber bundle with an optical diameter of 14 mm (efficiency is defined by the DIN standard as the coefficient of utilization, the ratio of the luminous flux radiated by the illuminating system to the luminous flux emitted by the illuminant).

The efficiencies hitherto reached in light input reflectors for optical-fiber systems are very low. In addition, the luminous intensity distribution on the light entrance surface of the optical-fiber system is extremely uneven in known reflectors, which entails various serious disadvantages.

SUMMARY OF THE INVENTION

The invention is therefore based on the problem of providing an improved light input reflector for optical-fiber systems, in particular one characterized by higher efficiency and permitting uniform light distribution based on the light entrance surface of the optical-fiber system.

The invention is based on the finding that this problem can be solved by calculating the reflector curve according to a certain algorithm that does not correspond to the algorithm for an ellipse or parabola.

The object of the invention is a light input reflector for optical-fiber systems characterized in that at least 50% of the deviated luminous flux of the lamp hits the light entrance surface of the optical-fiber system.

Conventional reflectors did not permit such high illumination of the light entrance surface. At least 80%, in particular at least 85%, of the deviated luminous flux of the lamp is preferably guided onto the light entrance surface.

The inventive light input reflector permits the efficiency according to the above definition to be increased to about 30%.

The light input reflector is also characterized in that the luminous intensity is very constant over the light entrance surface of the optical-fiber system, in particular varying no more than 10%, preferably no more than 5%.

This makes it possible to avoid the hitherto customary disadvantages in the luminous intensity distribution at the input point, as given e.g. in ellipsoid reflectors, which theoretically offer the best focusing but cause extreme irregularities in light distribution.

Evening out the luminous intensity distribution on the optical entrance surface simultaneously means a reduction of extreme temperature peaks due to the focused electromagnetic radiation, permitting higher lamp strengths.

The light deviation of the reflector takes place with consideration of the light distribution curve of the lamp. The luminous flux of the lamp is deviated into a solid angle range which originates in the optical light entrance diameter of the optical-fiber system. This ensures that more than 85% or even more than 90% of the deviated luminous flux of the lamp hits the light entrance surface of the optical-fiber system and can be taken up there.

The geometry of the inventive reflector is calculated according to the following formula:

$$\beta(n+1) = \tfrac{1}{2}\{\alpha(n+1) + \arctan(((\tan \gamma(n))^2 +/- d\phi/(\pi \cdot h^2 \cdot E_m))^{(1/2)})\}$$

wherein beta (n+1) is the angle of the algorithmically following reflector tangent;
    the first reflector tangent is calculated from the geometrical conditions resulting from the choice of gamma(n) and alpha(n)

alpha(n+1) is the angle of the lamp ray following after definition of the first lamp ray; delta-alpha holds as the criterion for the fineness of resolution of the calculated coordinates;
    start value alpha(n) characterizes the desired range as of which the light rays of the lamp are to hit the reflector gamma (n) is the angle of the desired first reflector ray dphi is the luminous flux of the lamp in the solid angle range to be calculated (see Catalog of Illuminants)

pi is the circle ratio 3.1415 . . .

h is the distance of the useful plane, and

Em is the desired mean luminous intensity or the result of total luminous flux of the lamp, max. angle of radiation and distance h of the useful plane.

From the mathematical intersection of the straight line with the calculated slope beta(n+1) and the straight line with the slope alpha(n+1) one can calculate the concrete coordinates.

The essential feature of the formula is that the crucial value, the slope of the reflector tangent, is initially independent of the reflector size, resulting in a group of curves of identical reflector shapes.

Definition of the constructional diameter also defines the reflector to be designed.

Furthermore the conception of the calculated reflector takes into consideration that diverse optical-fiber systems have different optical entrance diameters (or entrance surfaces). By shifting the lamp within the reflector one can adapt the light distribution of the calculated reflector to the various entrance diameters, thereby retaining both the high efficiency and the uniform distribution of luminous intensity on the light entrance surface of the optical-fiber system.

By applying a dichroic coating to the reflector one obtains a further improvement with respect to the reduction of thermal radiation. In particular it is advantageous to use a dichroic coating which already stops reflecting the arising thermal radiation of the lamp as of about 700 nm, transmitting it into the surrounding lamp housing from where this electromagnetic radiation is dissipated in the form of convective heat.

This means for the illuminating system that, due to the calculated and specially coated reflector, the thermal radiation is considerably reduced when passing into the optical-fiber system and very little thermal radiation leaves the optical-fiber system together with the transmitted visible light.

This is particularly important in various cases of application, such as glass cabinets, since one can provide in this way, and in combination with a glass-fiber optical system which also filters the UV radiation below 400 nm, an illuminating system which only emits light within the humanly visible spectrum. All unnecessary or even disturbing electromagnetic radiation can thus be eliminated.

It is possible to increase or reduce the calculated reflector curve path due to technical marginal conditions, and to obtain the same effect for various optical-fiber systems. This is particularly important with respect to the great diversity of lamps because it permits a special reflector to be made for each type of lamp according to the calculated reflector by using all existing so-called point sources of light (such as halogen bulbs, halogen lamps, metal vapor lamps, short-arc lamps, etc.), whereby the resulting assortment of reflectors (group of curves) differs only in the size of the reflectors, while the curve path is retained according to the same algorithm or the same marginal conditions.

The marginal conditions are, firstly, the dimensioning of the reflector size by the selection of angles of lamp irradiation alpha 1 and alpha 2 and, secondly, the definition of the radiation patterns of the reflector for light focusing beginning with gamma 1 up to the maximum angle of radiation gamma max. The path of the reflector curve (tangential slopes) is calculated according to the algorithm to obtain a uniform luminous intensity on the optical light entrance diameter. Various focal positions for obtaining different diameters on the optical light entrance diameter can be taken into consideration.

BRIEF DESCRIPTION OF THE DRAWINGS

The invention will be explained in more detail in the following with reference to the drawing.

The single FIGURE shows a schematic representation of the light radiated by a light input reflector being coupled into an optical-fiber system.

DETAILED DESCRIPTION OF THE PREFERRED EMBODIMENTS

The light of lamp 1 with focus 2 is reflected by reflector 3 onto light entrance surface 7 of optical-fiber system 6.

Number 4 refers to the group of possible reflector curves of different sizes which are defined by angles alpha 1 and alpha 2.

The optical axis is referred to as 5.

The radiation patterns are defined via angles gamma 1 and the maximum angle of radiation gamma max.

I claim:

1. A light input reflector for optical-fiber systems, wherein at least 50% of the deviated luminous flux of the lamp hits the light entrance surface of the optical-fiber system, and wherein the geometry of the reflector is calculated according to the formula $beta(n+1) = \frac{1}{2}\{alpha(n+1) + arctan(((\tan gamma(n))^2 +/- dphi/(pi*h^2*Em))^{1/2}))\}$ wherein beta(n+1) is the angle of the algorithmically following reflector tangent;
  the first reflector tangent is calculated from the geometrical conditions resulting from the selection of gamma(n) and alpha (n)

alpha(n+1) is the angle of the lamp ray following after definition of the first lamp ray;
  delta-alpha holds as the criterion for the fineness of resolution of the calculated coordinates;
  start value alpha(n) characterizes the desired range as of which the light rays of the lamp are to hit the reflector gamma (n) is the angle of the desired first reflector ray dphi is the luminous flux of the lamp in the solid angle range to be calculated (see Catalog of Illuminants)

pi is the circle ratio 3.1415 . . .

h is the distance of the useful plane, and

Em is the desired mean luminous intensity or the result of total luminous flux of the lamp, max. angle of radiation and distance h of the useful plane.

2. The light input reflector of claim 1, wherein at least 80% of the deviated luminous flux of the lamp hits the light entrance surface of the optical-fiber system.

3. The light input reflector of claim 1, at least 85% of the deviated luminous flux of the lamp hits the light entrance surface of the optical-fiber system.

4. The light input reflector of claim 1, wherein the luminous intensity varies by no more than 10% over the light entrance surface of the optical-fiber system.

5. The light input reflector of claim 1, wherein the luminous intensity varies by no more than 5% over the light entrance surface of the optical-fiber system.

6. The light input reflector of claim 1, wherein the reflector has a dichroic coating.

7. The light input reflector of claim 6 wherein the dichroic coating does not reflect radiation with a wavelength longer than 700 nm.

* * * * *